United States Patent [19]
Liou

[11] Patent Number: 6,096,166
[45] Date of Patent: *Aug. 1, 2000

[54] SPEAKER COVER ASSEMBLY APPARATUS

[76] Inventor: Tim Liou, 18800 Vintage St., Northridge, Calif. 91324

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/274,195

[22] Filed: Jul. 12, 1994

[51] Int. Cl.[7] .................................................. B32B 31/00
[52] U.S. Cl. ...................... 156/494; 156/515; 156/583.1
[58] Field of Search .................................. 156/494, 515, 156/580, 581, 583.1

[56] References Cited

U.S. PATENT DOCUMENTS

| 4,818,331 | 4/1989 | Shimada | 156/485 |
| 5,080,749 | 1/1992 | Moriya et al. | 156/382 |
| 5,324,384 | 6/1994 | Spengler | 156/581 |

Primary Examiner—James Sells
Attorney, Agent, or Firm—Fulwider Patton Lee & Utecht, LLP

[57] ABSTRACT

An apparatus and method for assembly of speaker covers which provides for attaching fabric to a speaker cover frame. The fabric and frame are placed into the apparatus. The apparatus first positions the fabric and frame in a secure manner and tensions the fabric against the frame. The fabric is folded about the frame to position the fabric for attachment to the rear of the frame. A heat welding device then bonds the fabric to the frame and simultaneously trims off any excess fabric.

7 Claims, 5 Drawing Sheets

SPEAKER COVER ASSEMBLY APPARATUS

FIELD OF THE INVENTION

The present invention relates to a speaker cover assembly apparatus for attaching fabric to a speaker cover frame.

BACKGROUND OF THE INVENTION

The history of sound equipment, in particular stereo speakers, has brought about many changes particularly in home stereo equipment. The earlier products were produced and designed as furniture to complement the living area where the sound system was to be located. This resulted in many ornate designs which emphasized the aesthetic value of the housing. Typically, early sound systems also included the entire tuner, amplifier and speakers within the unit. These earlier models included a window wherein fabric was glued over the perimeter of the window from inside the sound unit. The speaker was installed behind the fabric covered window within the unit.

With the advent of stereo sound and the transistor, sound systems began to separate the speakers into left and right sides of the listening area to obtain the greatest stereo effect. Because sound systems were becoming smaller in size, they evolved from a decorative unit into smaller, functional and interchangeable units where different components could now be interchanged to allow the user to adapt the system to his/her own particular needs. In the evolution of the adaptable sound system it has become necessary for the speaker to adapt as well.

The sound speaker today is a functional unit of varying size. With the introduction of surround sound, the need has grown for various speakers tailored for a particular sound effect to be introduced into different corners of a listening area. In addition, some speakers also require adjustments conforming it to the particular listening environment. The introduction of speakers for particularized purposes has created a need for building a speaker housing which protects the speaker without hindering the sound quality. The housing must be inexpensive to build, since the greater cost of the unit is borne by the speaker installed within the speaker housing. However, this low cost must be balanced with aesthetic considerations due to the fact that the speakers will be located throughout a principle living area and positioned for obtaining a complete surround sound effect.

With all the changes to speaker designs, the speaker housing still requires some sort of screen or shield which covers and protects the functional features of the speakers while allowing sound to be distributed unaffected. In addition, many speakers incorporate equalization adjustments behind the cover. Thus, easy access must be provided to the user to allow equalization adjustment of the speakers once they have been put to use.

The modern speaker cover must be adaptable to meet these varying needs and yet must be simple to manufacture. Prior methods of assembly of speaker covers have primarily been directed to various time consuming and expensive manual assembly processes. As can be readily recognized, manual assembly methods are slower and therefore more time consuming than automated methods. Additionally, when the salaries and related expenses of the workers are factored in, such methods are also normally more expensive.

Thus, there exists the need for a speaker cover assembly apparatus which can quickly and economically produce such a speaker cover. In addition, a speaker cover which has a fabric screen attached around a lightweight plastic frame must be constructed with the fabric wrapped tightly about the frame to maintain an immobile layer which prevents small objects from contacting and damaging the speakers. A need therefore exist for an assembly apparatus capable of attaching the fabric to the speaker frame to provide this protective capability in an economical manner.

SUMMARY OF THE INVENTION

The present invention relates to a method and apparatus which quickly and economically forms a fabric speaker cover around a pre-formed speaker cover frame. The apparatus tightly stretches the speaker cover fabric over the frame to protect the speaker from dust and damage from small objects which may bump the front of the speakers, while not detracting from the sound quality of the speakers. Moreover, the apparatus can be run using low skilled labor thus reducing operating costs while quickly producing the product.

The present invention utilizes the time and cost saving manufacturing benefits of heat welding plastic components. In particular, the present invention utilizes two plastic components to assemble the speaker cover. A plastic frame and fabric formed of plastic material are combined to form the finished speaker cover. The fabric is placed on an assembly platform which grabs and stretches the fabric tightly in all directions. The plastic frame is then placed in overlying relation to the fabric. A mounting head is driven down from above the speaker frame to engage and provide lateral and longitudinal support to the speaker frame during mounting of the fabric on the frame. The fabric completely underlying, and therefore covering the frame, is then stretched over the frame about its periphery. The fabric is then automatically heat welded onto the frame. The heat welding step also severs any excess fabric from the finished speaker cover. Once the welding step is complete the mounting head is withdrawn and the operator removes the assembled speaker cover. Typically a decal or other type of emblem is glued or otherwise affixed onto the front of the cover in order to identify the speaker manufacturer.

Thus in the assembly process utilizing the instant invention the operator will only be required to align the fabric and frame at the start of the assembly operation, and then remove the assembled product once the machine is completed. Each assembly step during the assembly process is undertaken automatically by the apparatus.

Other features and advantages of the invention will become apparent from the following detailed description, taken in conjunction with the accompanying drawings, which illustrate, by way of example, the features of the invention.

DETAILED DESCRIPTION

Referring to FIGS. 1–5, the construction of the assembly apparatus of the present invention will be described. Generally, a supporting structure 2 is attached to or mounted atop work support structure 4 which provides a rectangular working surface 6 which is maintained generally parallel to the ground at a distance from the ground sufficient to provide user access to the entire surface from a standing position. In a preferred embodiment work support structure 4 has a rectangular configuration such as a standard work bench or table. Supporting structure 2 is comprised of four support columns 3 mounted proximate each of the corners of work support structure 4. Mounted centrally on the surface 6 of structure 4 is an assembly base apparatus 8. Assembly base apparatus 8 is essentially comprised of four major subcomponents or subassemblies.

The first subassembly is a mounting platform 10. The mounting platform 10 includes an upper support surface 12 which is positioned parallel to the surface 6 of the work support structure 4. The peripheral dimensions of the mounting platform upper surface 12 generally approximates the peripheral dimensions of the speaker frame 14. In a preferred embodiment the speaker frame 14 is of a rectangular configuration. It is to be recognized that other speaker configurations may be employed in connection with the instant invention. The mounting platform 10 is supported by a plurality of support rods 16 which extend perpendicularly from the under side of the mounting platform 10 through apertures 18 in the work support structure 4. At the distal end of the rods 16 restraining nuts 20 are threadably connected to the threaded ends of the rods. Positioned between the work support structure 4 and the under side of mounting platform 10 and surrounding each of the rods 16 are biasing springs 22 which bias the mounting platform 10 a preselected distance above the work support structure 4. The height of the upper support surface 12 of mounting platform 10 may be adjusted by means of restraining nuts 20.

Figure 1:
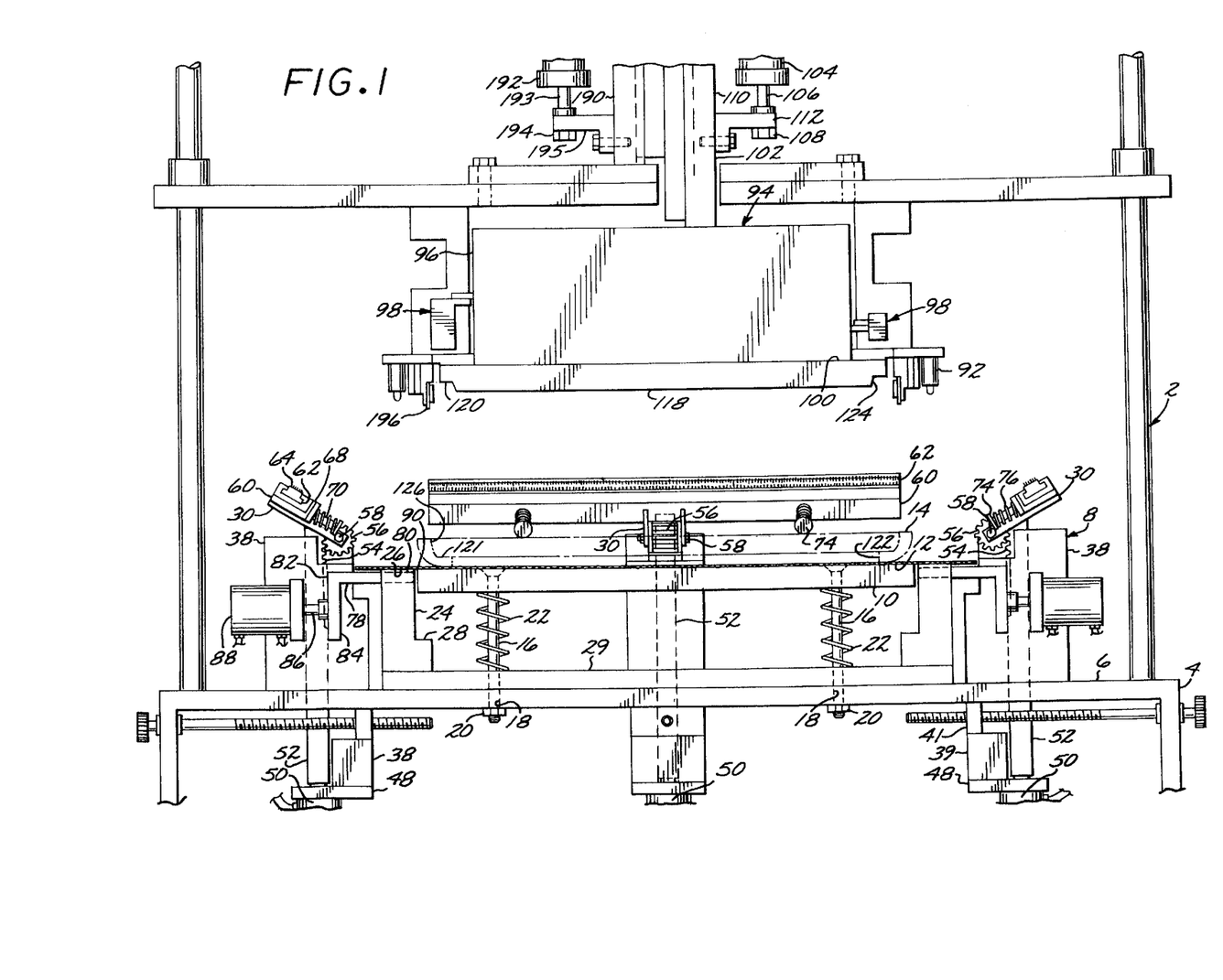
FIG. 1 The assembly apparatus of the instant invention with fabric and frame in place.

Positioned around the edge or periphery of the mounting platform 10 is the second subassembly of assembly base 8, a mounting support assembly 24. The mounting support 24 is rigidly connected to the work support structure 4 and arranged such that the top surface 26 of the mounting support 24 is planar with the upper surface 12 of the mounting platform 10 when said platform is fully biased by the biasing springs 22. A shoulder or step 28 is formed in the mounting support 24 near the work support structure 4 extending under the mounting plate 10. As shown in FIG. 1 a rectangular support plate 29 may be positioned between the base of the mounting supports 24 and the work support structure 4.

The third subassembly comprising the assembly base 8 is a plurality of fabric gripping arms 30, 32, 34, 36 positioned along each side of the mounting platform 10. In the context of a rectangular speaker cover a total of four, arms 30, 32, 34 and 36 are provided. Referring to FIG. 1, the gripping arms 30–36 are movably coupled to the working support structure 4 by means of gripping arm support 38 which is positioned proximate the midpoint of each side of the mounting platform 10 such that the mounting support 24 is interposed between the mounting platform 10 and gripping arm support 38. The working support structure 4 further includes four slots or tracks (not shown) extending radially away from the boundary of the mounting platform 10 perpendicular to the midpoint of each side of the mounting platform 10. The gripping arms 30–36 are rotatably connected to the upper section of gripping arm supports 38 by means of bolt or pivot rod 58.

Further referring to FIG. 1, the base component 39 of gripping arm support 38 is mounted beneath working support structure 4 and is connected to support 38 by means of connecting member 41 which extends through the slots or tracks in the working support structure 4. A lower flange support 48 maintains a piston drive mechanism 50 in operational relationship to the gripping arm 30. The piston rod 52 of the drive mechanism 50 extends perpendicularly to the working support structure 4 through the slots or tracks. Along one side of said piston rod 52 facing the mounting platform 10 is a rack of teeth 54 formed into the piston rod 52. A pinion gear 56 is rotatably mounted about axle 58 at the lower end of gripping arm 30. Connected to the ends of the axle 58 and extending radially away from the axle 58 are the gripping arms 30. The arms 30 may be moved in angular displacement with respect to the gripping arm support 38 by means of the vertical displacement of piston rod 52. The rack of teeth 54 on rod 52 engage pinion gear 56 causing gripping arms 30 to rotate about axle 58 as rod 52 moves vertically.

Each of the gripping arms 30 is connected to a gripping holder 60. A brush 62 for gripping the speaker fabric is formed from metal or plastic bristles 64 and extends the majority of the length of the respective side of the mounting platform 10. The gripping holder 60 forms an L-shape with a short flange 68 extending perpendicularly away from the gripping arms 30. Coupling rods 70 connected to the brush 62 extend through apertures (not shown) in the short flange 68. At the distal end of each rod a nut 74 is threadably connected and maintains a biasing spring 76 between the nut 74 and short beam 68. Thus, the brush 62 is movably connected with the gripping holder 60 providing for overtravel or additional lateral movement to the gripping arms 30–36.

Figure 2:
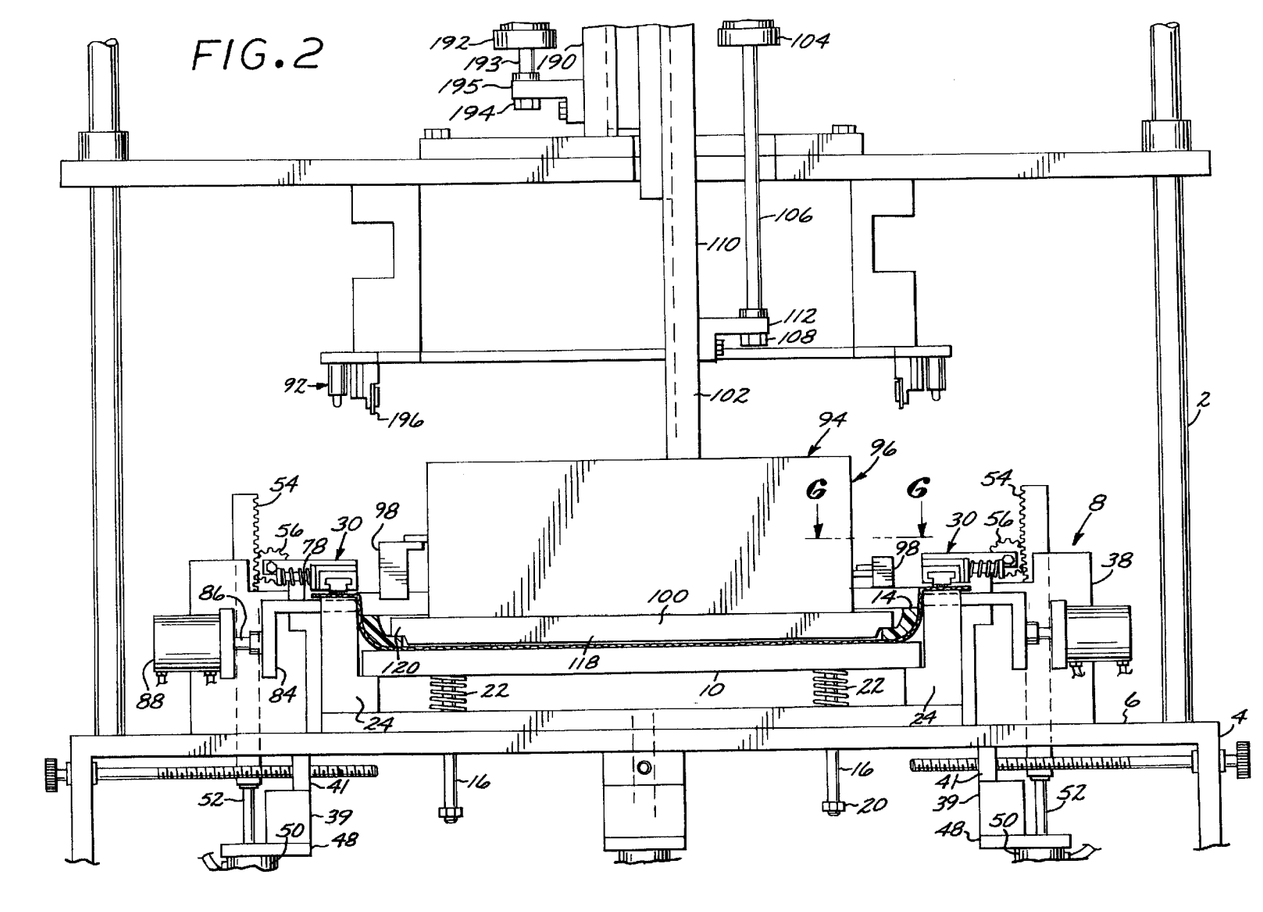
FIG. 2 The assembly apparatus of the instant invention with the fabric gripped and speaker cover frame pressed down to stretch said fabric.

For each of the gripping arms 30–36 the piston drive mechanism 50 operates to move the piston rod 52 so as to rotate the gripping arms 30 until the brush 62 is brought into an overlying contact with the upper surface 26 of mounting support 24 (FIG. 2). When the piston rod 52 is withdrawn into the piston drive mechanism 50, the brush 62 is moved away from the mounting support by the rotation of the gripping arms 30 (FIG. 1).

The fourth subassembly comprising the assembly base 8 is arm 78 positioned with its upper surface 80 flush with the surface 12 of mounting platform 10 when said platform is in a fully biased position by the biasing springs 22. The arm 78 lies within a recess in the mounting support 24 along each side of the mounting platform 10. Two segments 82 of the arm 78 extend laterally outward from the mounting platform 10 and past the mounting support 24. At the distal end of each arm 78 a vertical tongue 84 extends perpendicularly downward toward the working support structure 4. Connected to the tongue 84 is a piston rod 86 of a piston drive mechanism 88. The piston drive mechanism 88 provides lateral movement of the arm 78 in a linear direction towards and away from the mounting platform 10.

At the commencement of the assembly process, the speaker cover components comprising a plastic fabric 90 and plastic frame 14 are placed on the support platform 10, respectively. The fabric 90 is of a size sufficient to completely cover the top surface of the mounting platform 10 and the surrounding mounting support 24. The speaker frame 14 which comprises dimensions approximately equivalent to the upper surface 12 of the mounting platform 10, is placed in an overlying relation to the fabric 90 and positioned to align the speaker frame 14 in overlying relation with the mounting platform 10.

The joining of the fabric 90 to the speaker frame 14 is accomplished by means of a heat welding device 92 and upper mounting assembly 94 which are connected to support structure 2 and are centered above the base assembly 8.

The upper mounting assembly 94 is comprised of three subassemblies, a clamp housing 96, a plurality of welding clamps 98, and a frame mount 100.

The clamp housing 96 is coupled to the support structure by means of a vertical beam support 102 and piston drive mechanism 104. The beam 102, which is positioned perpendicular to the mounting platform 10, is coupled to the support structure 2 (not shown) to guide and vertically align the housing 96 while piston drive mechanism 104 drives the housing 96 from a raised, disengaged position (FIG. 1) to an engaged clamping position (FIG. 2). Piston rod 106 is connected at its distal end 108 to the beam surface 110, via a bracket 112 which is bolted on to distal end of the piston rod 108 and the surface 110 of beam 102.

The frame mount 100 is attached to the bottom side surface of the clamp housing 96. The frame mount 100 comprises a center portion 118 surrounded by a border section 120. As shown in the drawings, section 118 is thicker than section 120 such that shoulder 124 is formed at the junction of sections 118 and 120. The peripheral dimensions of center portion surface 118 are less than the interior peripheral dimensions of aperture 122 of the speaker frame 14. When the piston drive mechanism 104 is operated to move the housing 96 downward toward the mounting platform 10 the center portion 118 of frame mount 100 contacts the fabric 90 below the speaker frame 14 while the frame clamp border 120 contacts the inner ridge 121 of the speaker frame 14. Shoulder 124 allows the frame mount 110 to nest within the frame aperture 122 without requiring exact positioning of the speaker frame 14. The frame mount 110 shown in FIG. 2 provides both lateral and longitudinal support to the speaker frame 14. The frame mount 110 driven by piston 106 in turn moves the mounting platform 10 downward against the biasing springs 22 and the mounting platform 10 contacts the shoulder 28 of the mounting support 24. Thus, longitudinal support for the speaker frame 14 during the assembly process is provided by mounting the speaker frame 14 clamped between the frame mount 110 and mounting platform 10. The shoulder 124 contacts the upper corner 126 of the speaker frame 14 to translate the longitudinal support of the frame mount 110 into lateral support.

During the assembly process the fabric is pulled tightly over the speaker cover frame and heat welded to the back of the frame. The fabric is pulled into position by means of welding clamps 98.

Figure 3:
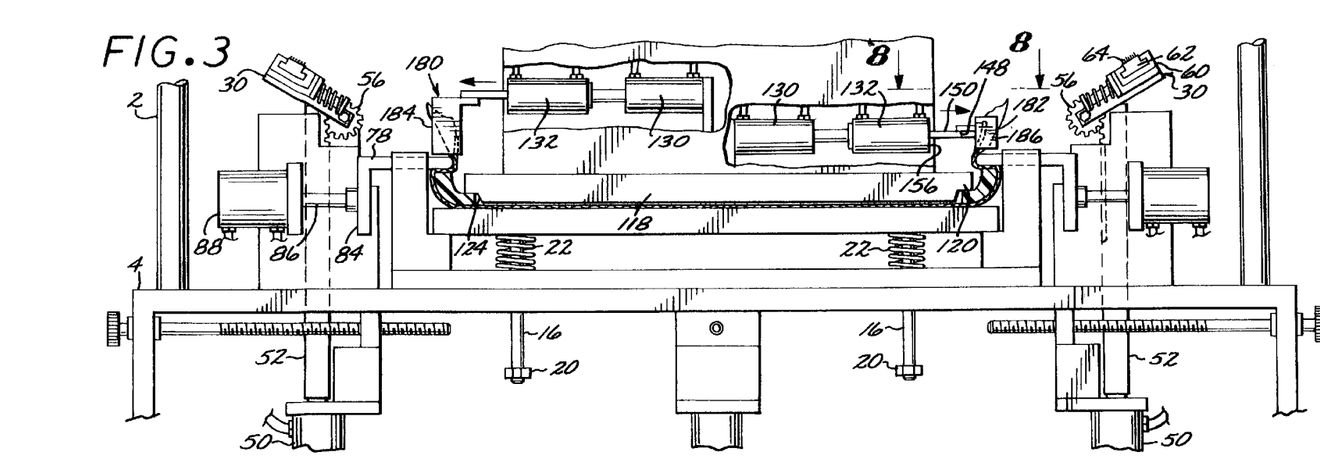
FIG. 3 The assembly apparatus of the instant invention during a intermediate step in the assembly process.
Figure 4:
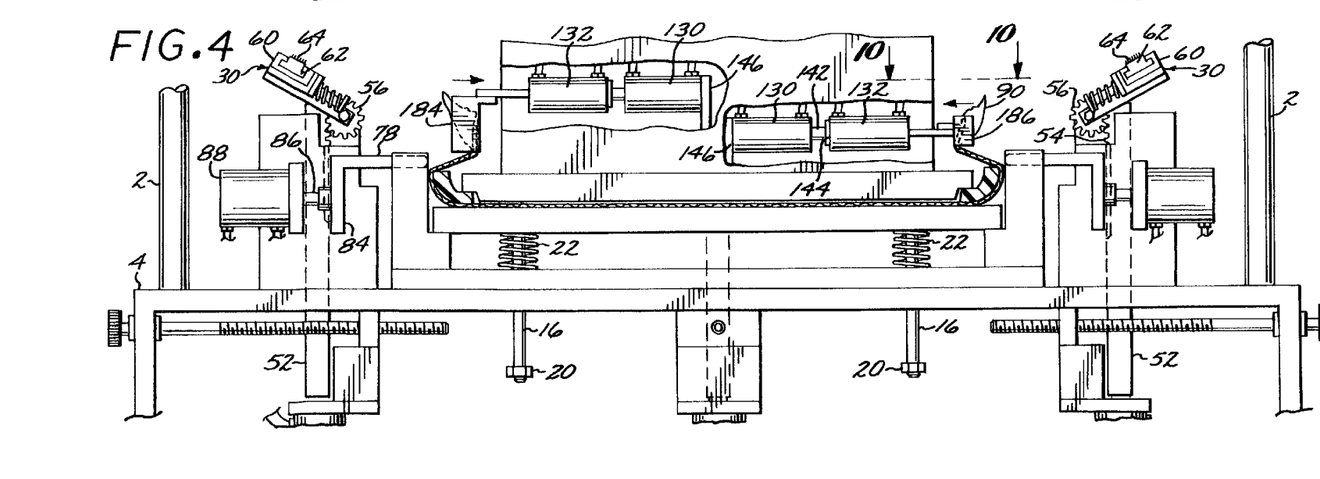
FIG. 4 The assembly apparatus of the instant invention in a subsequent intermediate step.
Figure 5:
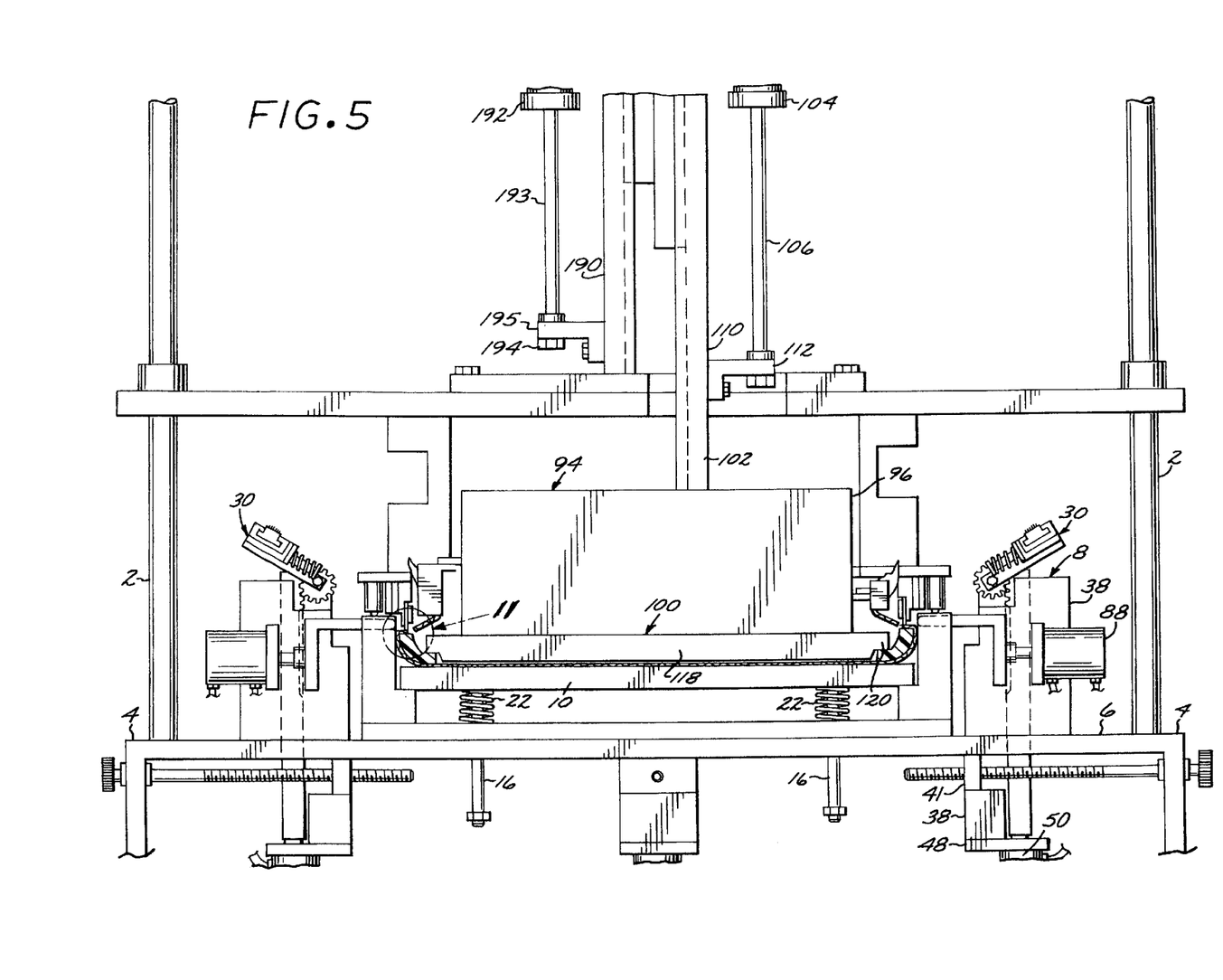
FIG. 5 The assembly apparatus of the instant invention in the heat sealing step.
Figure 6:
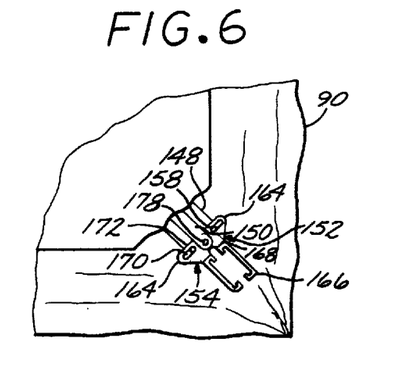
FIG. 6 A top view of the fabric clamp assembly of the instant invention.
Figure 7:
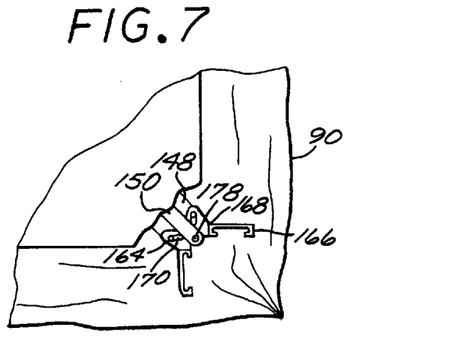
FIG. 7 A top view of the fabric clamp assembly of the instant invention in a partially opened position.
Figure 8:
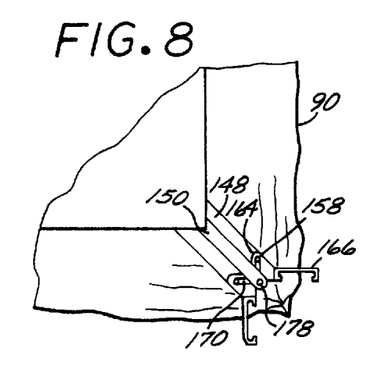
FIG. 8 A top view of the fabric clamp assembly of the instant invention in a fully extended and open position.
Figure 9:
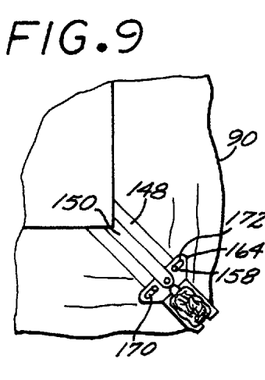
FIG. 9 A top view of the fabric clamp assembly of the instant invention in a fully extended and closed fabric clamping position.

As shown in FIG. 3, the welding clamps are driven by drive piston mechanisms 130 and 132 located within the clamp housing 96. The clamps 98 are positioned to extend laterally out of the housing 96 from each of the four corners 134 (FIGS. 6–10) of the rectangular housing 96. The clamps 98 each include a pair of piston drive mechanisms 130 and 132 shown in FIGS. 3 and 4. The drives 130–132 are connected in series such that the extension and retraction of the piston rod 142 of the first drive 130 is connected to the second piston drive 132 at 144. The extension and retraction of the first piston rod 142 moves the second piston drive 132 between a position proximate to housing 96, FIG. 3, to a position proximate to the first piston drive 130, FIG. 4. A stop 146 connects the first piston drive 130 to the housing 96. The stop 146 provides additional lateral support.

The actual welding clamp 98 comprises four components; two clamp guides 148 and 150 and two clamp arms 152 and 154. The first clamp guide is a guide bar 148 connected to the front 156 of the second piston drive 132. The first clamp guide or bar 148 includes upper surface 157. Two guide pegs 158 extend out of upper surface 156. The second clamp guide 150 is actually the piston rod 150 of the second drive piston 132. Interposed between the two clamp guides 148 and 150 are a right 152 and left 154 clamp arm. Each clamp arm 152 and 154 comprise a triangular linkage 164 with a clamp 166 extending out of the apex 168. A slot 170 runs along the base 172 of the triangular linkage 164 and forms a slot linkage with the respective guide pegs 158 of the guide bar 148. One of the corners of each triangular linkage is coupled to the second clamp guide 150 at 178. When the second clamp guide 150 is extended or withdrawn from the housing 96 with respect to the first clamp guide 148 the triangular linkage at 164 translates the linear motion into rotational motion about point 178 thus adjusting the clamp arm's angular displacement between a closed and an open position as shown FIGS. 6 and 7, respectively.

The welding clamps 98 extend from the four corners of the clamp housing 96 in alternating upper 180 and lower 182 positions such that opposing corner clamps are either in an upper position 180 or lower position 182. The clamps 98 connected to the clamp arms 152 and 154 are two types. A longitudinally elongated clamp 184 for the upper positioned welding clamps ensures the upper positioned clamps have their bottom edge level with or in a planar relationship to the lower edge of clamps 186.

Figure 10:
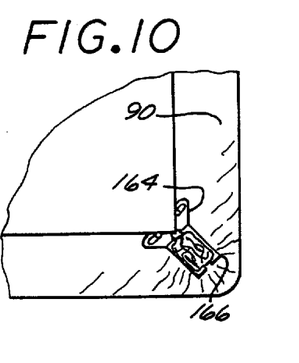
FIG. 10 A top view of the fabric clamp assembly of the instant invention in a retracted clamping position.

Thus, the welding clamps 98 in operation, are shown in FIGS. 6–10. From a rest position FIG. 6, the piston rod 150 of the second piston 132 is extended rotating the clamp arms 160 and 162 to an open position shown in FIG. 7. The first piston drive rod 142 is then extended moving the welding clamps 98 outward to the corners of the fabric shown in FIG. 8. The second piston rod 150 is then retracted thereby rotating the clamp arms 160 and 162 to a closed position grabbing the fabric 90 shown in FIG. 9. The first piston rod 142 is then retracted and the clamps 98 are withdrawn into the housing 96 while gripping the fabric 90 as shown in FIG. 10.

The heat welder 92 forms a rectangular frame about the mounting clamp 94 with dimensions slightly larger than the mounting clamp 94. The heat welder 92 is coupled to the support structure 2 in an arrangement similar to the mounting clamp 94. The heat welder 92 is attached to a longitudinal beam 190 which is coupled to the support structure 2 (not shown) and a drive piston 192 with piston rod 193 is connected to the support structure 2 (not shown) with the distal end 194 of the piston rod 193 connected to the beam 190 via bracket 195.

Figures 11, 12, 13:
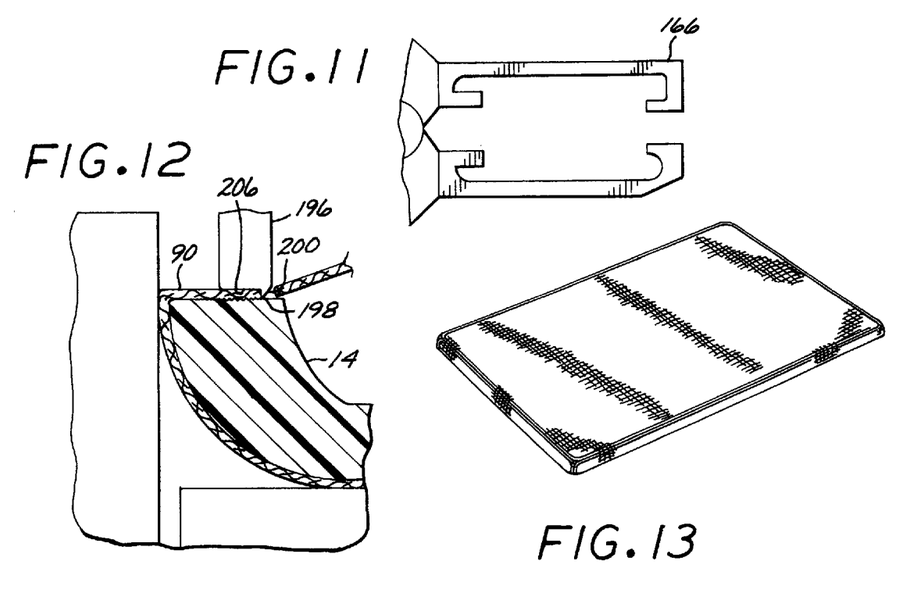
FIG. 11 A top view of the fabric clamp of the instant invention.
FIG. 12 A side view of the heat sealing and trimming step of the instant invention.
FIG. 13 The assembled speaker cover.

When the piston rod 193 is extended longitudinally the heat welder 92 is moved downward around the mounting clamp 94 assembly. Mounted on the heat welder 92 is a welding bar 196 which extends downward from the heat welder 92 to contact a portion of the speaker frame 198 (FIG. 12). The welding bar 196 is heated by conventional electrical heating elements (not shown). A knife edge 200 forms the lengthwise inner edge of the welding bar 196. The knife edge 200 heated with the rest of the welding bar cuts any fabric 90 in between the speaker frame 14 and the welding bar 196. The remainder of the flat bottom side 206 surface serves to weld the fabric 90 to the plastic speaker frame 14 by melting it into the speaker frame 14.

A conventional electrical control system (not shown) selectively operates all of the drive pistons through each of the steps in the assembly process. In the preferred embodiment the drive pistons are hydraulically operated. It will be appreciated that most of the steps are performed without operator assistance and therefore are suitable for a controller program. However, each step may also be performed manually.

In operation, the heat welder 92 and mount 94 are initially in a raised position overlying the base 8. The mounting platform 10 is flush with the mounting support 24 and mounting arm 78. The fabric 90 is placed by the operator over the base 8 to completely cover the mounting support 24 and the mounting platform 10.

Next, the gripping arms 30–36 are rotated by upward movement of piston 52 to engage the fabric 90 against the mounting arm 78. The operator then places the speaker frame 14 with the front side down over the speaker fabric 90. The speaker frame 14 is aligned to completely cover the mounting platform 10.

The next series of steps are then operated automatically. With the speaker frame 14 positioned, the mount 94 is lowered to engage and support the speaker frame 14 between the frame mount 100 and mounting platform 10. As the mount 94 moves downward the mounting platform 10 is positioned downwardly into firm contact with the inner lip 28 of the mounting support 24.

As the speaker frame 14 and underlying fabric 90 are moved down with the mounting platform 10, the overtravel on the gripping arms 30–36 permits the gripping arms to slide with the fabric 90, thus preventing the fabric 90 from being torn while moved downward.

Once the movement of the mount 94 is completed piston 52 is retracted and the gripping arms 30–36 are rotated away from platform 10 to release the fabric 90.

The fabric 90 still overlies the mounting support 24. The drive piston 88 for the surface arm 78 is engaged. With the speaker frame 14 located below the arm 78, the surface arm 78 folds the edge of the fabric 90 inward over the bottom edge of speaker frame 14.

The surface arms 78 expose the four corners of the fabric 90 while maintaining most of the lengthwise portions of fabric 90 folded over the frame speaker 14. Each of the welding clamps 98 are then engaged. The clamps each open and extend out to the corner folds of fabric exposed by the mounting arms 78. The welding clamps 98 then close and retract, pulling the fabric 90 tightly at each of the corners, with the corners maintained by the welding clamps 98. The surface arms 78 are then disengaged, leaving the fabric 90 held tightly stretched over the front of the speaker frame 14 and the backside border.

The heat welder 92 is then moved downward to engage the fabric 90 folded over the speaker frame 14. The heated welding bar 196 then contacts the fabric 90 melting it into the speaker frame 14. The knife 200 along the edge trims off any excess fabric 90. Once the fabric 90 is bonded on to the speaker frame 14, the welder 92 and mount 100 disengage and are retracted and the biasing springs 22 in the mounting plate 10 bring the mounting plate 10 into flush relation with the mounting support 24 topside.

The operator then removes the assembled speaker cover and the speaker assembly is ready for the next speaker cover to be assembled.

While a particular form of the invention has been illustrated and described, it will be apparent that various modifications can be made without departing from the spirit and scope of the invention.

What is claimed is:

1. A speaker cover assembly apparatus for positioning and bonding a fabric onto a speaker cover frame comprising:
    a mounting platform;
    a base assembly positioned around the periphery of said mounting platform;
    a plurality of rotatable fabric gripping arms positioned about the periphery of said mounting platform, said gripping arms rotatable between a first non-gripping position to a second gripping position;
    a plurality of fabric folding arms;
    a frame mount;
    a plurality of retractable fabric clamps; and
    a fabric bonding device.

2. The speaker cover assembly apparatus of claim 1 wherein the mounting platform is moveable from a first position in which said platform surface is planar with the base assembly to a second position which said mounting platform surface is beneath said base assembly.

3. The speaker cover assembly apparatus of claim 2 wherein the mounting platform is maintained in said first position by means of biasing means.

4. The speaker cover assembly apparatus of claim 1 wherein the frame mount is movable between a first non-engaging position to a second position in which said frame mount engages said speaker cover frame and fabric and moves said mounting platform to its second position.

5. The speaker cover assembly apparatus of claim 1 wherein the fabric bonding device comprises a heat welding device for securing the fabric to the speaker frame cover.

6. The speaker cover assembly apparatus of claim 1 wherein said rotatable fabric gripping arms include a biasing means which allows for lateral movement of the gripping arms to prevent tearing of the fabric while retaining tension on the fabric.

7. A speaker cover assembly apparatus for installing fabric over a speaker cover frame, the assembly apparatus comprising:
    a support structure;
    a mounting platform connected to said support structure and underlying said fabric wherein said fabric underlies said frame during assembly process;
    said mounting platform further comprising a center portion movable along a longitudinal axis;
    a plurality of gripping arms having a brush engagement, said arms selectively biased for stretching out the fabric;
    a fabric positioning device, connected to said support structure, wherein said positioning device folds the stretched fabric over the speaker frame;
    a frame support clamp, said frame support clamp operating to maintain said fabric and said frame against the mounting platform;

a fabric bonding blade coupled to said support structure for bonding the fabric to the frame;

said bonding blade operating to trim said fabric, whereby the blade bonds the fabric to the frame and severs any excess fabric from the frame during bonding;

corner clamps coupled to said frame support clamp wherein said corner clamps secure said fabric to cover said speaker frame during the bonding operation.

* * * * *